United States Patent [19]

Levin et al.

[11] 4,298,714
[45] Nov. 3, 1981

[54] MODIFIED POLYVINYLCHLORIDE

[75] Inventors: Gideon Levin; David Vofsi, both of Rehovot, Israel

[73] Assignee: Yeda Research & Development Co. Ltd., Rehovot, Israel

[21] Appl. No.: 217,144

[22] Filed: Dec. 16, 1980

[51] Int. Cl.³ ............................................. C08F 114/06
[52] U.S. Cl. .................................... 525/330; 525/350; 525/351
[58] Field of Search ........................ 525/330, 350, 351

[56] References Cited

U.S. PATENT DOCUMENTS 3,591,571  7/1971  Steinbach-Van Gaver ....... 260/92.8
3,696,084  10/1972  Gordon .......................... 260/79.3 R
4,098,763  7/1978  Starnes, Jr. ..................... 260/45.75

Primary Examiner—Joseph L. Schofer
Assistant Examiner—Bernard Lipman
Attorney, Agent, or Firm—Browdy and Neimark

[57] ABSTRACT

The present invention relates to modified polyvinylchloride, wherein part of the chlorine atoms are replaced by groups of the formula $-S-CH_2-CH_2-R-(CH_2-CH_2-R)_n-Alk$, wherein R is selected from oxygen, sulfur and $-NH-$, where R may also designate a bond, where Alk designates an alkyl group of up to 14 carbon atoms, and where n is zero or an integer of from 1 to 100, and to a process for the production of such modified polyvinylchloride polymers which comprises reacting an aqueous emulsion or suspension of polyvinylchloride in the presence of a solvent adapted to cause swelling of the PVC particles with a compound of the formula $Alk-(CH_2-CH_2-R)_n-R-CH_2-CH_2-SH$, wherein Alk, R and n are as defined above.

8 Claims, No Drawings

MODIFIED POLYVINYLCHLORIDE

FIELD OF THE INVENTION

It is an object of the present invention to provide a new polymeric composition of matter. Furthermore, the invention relates to the modification of polyvinylchloride (P.V.C.) by reaction with certain thiol-group containing etheric or thioetheric compounds, to form a family of novel chlorine, sulfur and/or oxygen containing polymers.

BACKGROUND OF THE INVENTION

Chemically modified Poly-Vinyl-Chloride compositions are numerous and well-known. The usual approach to modification of this polymer is by means of grafting onto the macromolecule of various other reactive monomers, or telomers, or other entities, by chemical, photochemical or radiation initiation. Processes of this kind are well documented. Thus, A. Chapiro, in his book "Radiation Chemistry of Polymeric System," New York Interscience, V., 15, 1962, extensively quotes many cases of radiation grafting of various monomers to P.V.C. More recently, Kennedy has developed a general method for the chemical grafting of certain monomers to P.V.C., using an alkyl-aluminium catalyst (Cationic Graft Copolymerization, J. P. Kennedy, Editor-Interscience, 1977).

All these methods lack practicality, and no commercial application has, to our knowledge, resulted from these and similar approaches for several reasons. Radiation-grafting requires expensive and cumbersome equipment, as well as elaborate safety precautions. The catalytic methods of Kennedy involve the use of expensive and dangerous-to-handle metallo-organic compounds. In addition, to effect a grafting reaction on P.V.C. in accordance with the various methods described in the literature, the P.V.C. has to be dissolved in an organic anhydrous solvent, such as cyclohexanone, or tetrahydrofuran, forming very viscous solutions even at quite low concentrations, which are extremely difficult to handle in a chemical reaction. This is the main reason why previous attempts to modify P.V.C. by grafting reactions remain to-date a laboratory exercise only.

The interest in graft-modified P.V.C. is very considerable. This is spurred by the various well-known shortcomings of neat Poly(Vinyl-Chloride), especially when intended for certain particular uses. Thus, P.V.C. is largely being used in a highly plasticized form, for the production of films, tubing, coatings, etc. The common plasticizers used are the various phthalate esters, and particularly di-2-ethylhexyl phthalate—lack in "permanence" and tend to exude in time from the polymer composition, leaving an embrittled, friable object. The extraction of plasticizer—which does not form a chemical bond with the macromolecule—is particularly accelerated by contact with various solvents that leach it out from the polymer matrix. Such plasticized compositions are, therefore, restricted to use in solventless environments.

As a result of the possible exudation of the phthalate plasticizers these compositions have lately become a subject for review, since they have been shown in induce tumors in the liver of mice (cf. C and EN p. 5, May 5, 1980).

Another well-known drawback of commercial P.V.C. compositions is their hydrophobic nature. This results in the accumulation of static electricity, and the easy deposition of dust, which in certain applications (music records, greenhouse coverings, textile fibers) is very deleterious.

SUMMARY OF THE INVENTION

These and other shortcomings of the neat P.V.C. polymer may be eliminated or greatly reduced when the base macromolecule is modified by means of a grafting reaction.

Thus, if one succeeds to graft onto the P.V.C. molecular backbone a moiety that imparts to it a plastification effect, this moiety will not be leachable, since it is bound to the P.V.C. backbone by means of a chemical bond, rather than by weak molecular interaction forces, as is the case with common plasticizers.

It is probable that if a moiety containing hydrophilic groups is grafted onto the P.V.C. backbone, there may be obtained a less hydrophobic, charge-dissipating plastic composition, that will be less prone to dust accumulation.

These and similar highly desirable modifications, however, have hitherto not been effected on an industrial scale because of the aforementioned reasons.

According to the invention there is provided a process, whereby it is possible to effect a grafting reaction on P.V.C. in a substantially aqueous medium, by using either emulsified or suspended P.V.C. as is readily available from the conventional polymerization processes.

Specifically, the process of this invention allows the grafting onto the P.V.C. backbone of the general class of compounds having the formula:

$HSCH_2CH_2R{-}CH_2{-}CH_2R{-}_nCH_2CH_2RAlk$ where n, R and Alk are as defined hereinafter, resulting in a family of novel modified P.V.C. compositions.

The reaction in accordance with this invention is commonly referred to as a "nucleophilic substitution reaction" which is documented in the literature [see f.i. (1) Okawara et al, Kogya Kagadu Zasshi 70, 2382 (1967); (2) Okawara Joint Conference ACS and JCS, Hawaii, 1979].

The grafting reaction is represented by the following scheme:

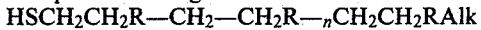

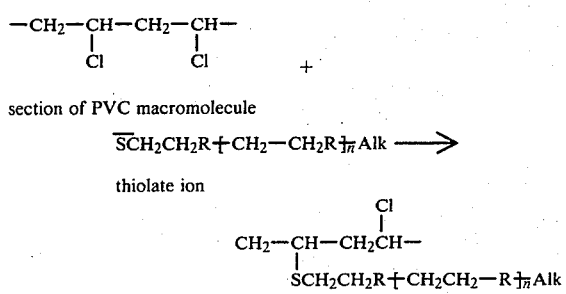

where n may be an integer with a value from zero to 100, Alk denotes a lower alkyl group, such as methyl, ethyl, etc. and R may be an oxygen (O) or a sulfur (S) atom, an NH group, or a bond.

While the above scheme represents the process in accordance with the invention, the preferred reaction is the one wherein R stands for oxygen.

As will be seen from subsequent examples, it is possible to effect a nucleophilic displacement by means of a thiolate ion of an alkane [R=a bond]. This reaction proceeds in accordance with the hereinafter described process to a rather low degree of substitution at a modest rate.

The surprising feature of the present invention is in the extreme ease with which poly-ether thiolate may be grafted to P.V.C. in emulsion or suspension in a substantially aqueous medium-as contrasted to a thiolate of an alkane. A similar reaction proceeds easily with a thiolate of a poly-thioether.

To effect the reaction, the P.V.C. emulsion, or suspension, as it emerges from the polymerization reactor, or indeed before being discharged from the reactor, is mixed together with an aqueous solution of the desired alkali thiolate of the compound to be grated, the final pH of the mixture being about 13–14, and the temperature about 80°–100° C.

To facilitate and expedite the reaction, a small amount of a solvent such as cyclohexanon or THF is added. This solvent penetrates the P.V.C. particles and causes them to swell somewhat, thus facilitating the penetration of the thiolate moiety to the reaction site. Upon completion of the reaction, the polymeric product is caused to coagulate and is separated in the conventional way.

The utility of products obtained according to this invention is well recognized. Grafted poly-ethers and poly-thioethers possess properties similar to plasticized P.V.C. compositions, and form a truly "internally plasticized" poly(vinyl-chloride), whose "permanence" is limited only by the breaking force of the C-S bond.

P.V.C. variously compounded with certain poly-ethers such as, f.i. poly-oxyethylene, have been previously mentioned as useful compositions. Recently, compositions of this kind were mentioned in a U.S.S.R. Pat. No. (CA9306047893) as a useful WAX-lubricant.

The degree of internal "plastification" will depend on the degree of chlorine substitution, on the one hand, and on the value of the integer n—on the other, and both may be varied within rather broad limits by adjustment of the reaction parameters.

The thus modified polymers may be compounded and processed by the usual methods, such as extrusion, coating, calandering and injection molding.

The following examples describe the process and nature of the novel, modified P.V.C. compositions, and the examples are to be construed in a non-limitative manner.

DESCRIPTION OF THE PREFERRED EMBODIMENT

General Procedure

A measured amount of suspension or emulsion of polyvinylchloride (Frutarom, Electrochemical Co., Haifa, Israel) in water was continuously stirred and heated on an oil bath. A solvent such as DMF, THF, cyclohexanone or methylethylketone is added to the slurry. While mixing, equivalent amount of the nucleophile such as f.i. the sodium salt of 2-(2'-butoxyethoxy)-ethyl thiolate, is added to the slurry. After a certain time the stirring is discontinued, the reaction mixture is cooled to room temperature, the suspension is separated and the polymer is washed several times with distilled water, methanol and ether. The polymer obtained after washing is dissolved in tetrahydrofuran or chloroform and reprecipitated in methanol or petroleum ether.

EXAMPLE 1

(a) Composition of reaction mixture:

| | |
|---|---|
| Epivyl 43 | 250.0 cc |
| (PVC suspension, 35% solids, number average MW = 60,000) | |
| Water | 100.0 cc |
| $CH_3(CH_2)_3-O-(CH_2)_2-O-(CH_2)_2SH$ | 24.9 gr |
| Sodium hydroxide | 12.0 gr |
| Cyclohexanone | 10.0 cc |

(b) Conditions:
The reaction was effected during 24 hours, at a temperature of 100° C.
(c) Results:
The polymer obtained is flexible with an elastic modulus of $3 \times 10^2$ psi and maximum strain over 1200%. The sulfur and the chlorine content of this polymer is 7.8% and 29.7%, respectively.
The degree of substitution (D.S.)=23%.

EXAMPLE 2

(a) Composition of Reaction Mixture:

| | |
|---|---|
| Epivyl 43 | 30.0 cc |
| Water | 100.0 cc |
| $CH_3-(CH_2)_3-O-(CH_2)_2-O-(CH_2)_2SH$ | 15.0 gr |
| Sodium hydroxide | 8.2 gr |
| Cyclohexanone | 10.0 cc |

(b) Conditions:
The reaction was carried out at 80° C., during 48 hours.
(c) Results:
The polymer obtained has a modulus of elasticity of $1.5 \times 10^5$ psi and maximum strain of 327%. The sulfur and the chlorine content of this polymer is 3.2% and 45.2%, respectively. D.S.=7.5%.

EXAMPLE 3

(a) Composition of Reaction Mixture:

| | |
|---|---|
| Epivyl 43 | 25.0 cc |
| Water | 100.0 cc |
| $CH_3(CH_2)_3-O-(CH_2)_2-O-(CH_2)_2SH$ | 24.9 gr |
| Sodium hydroxide | 12.0 gr |
| Methylethylketon | 10.0 cc |

(b) Conditions:
The reaction was carried out at 78° C., during 48 hours.
(c) Results:
The sulfur and the chlorine content of the polymer is 3.37% and 44.25%, respectively.
D.S.=7.7%.

EXAMPLE 4

(a) Composition of Reaction Mixture:

| | |
|---|---|
| Epivyl 43 | 100.0 cc |
| $CH_3(CH_2)_3-O-(CH_2)_2-O-(CH_2)_2SH$ | 76.0 gr |
| Sodium hydroxide | 36.0 gr |
| Water | 200.0 cc |
| Cyclohexanone | 40.0 cc |

(b) Conditions:
The reaction was carried out at 100° C., during 88 hours.
(c) Results:

The sulfur and the chlorine content of the polymer is 9.47% and 23.4%, respectively.

D.S.=33%.

EXAMPLE 5

(a) Composition of reaction mixture:

| | |
|---|---|
| Epivyl 43 | 28.0 cc |
| Water | 50.0 cc |
| NOOH | 13.0 gr |
| Cyclohexanone | 19.0 ml |
| Lauryl Mercaptan | 32.9 gr |

(b) Conditions:

The reaction was carried out at 100° C., during 24 hours.

D.S.=9%.

We claim:

1. A modified polyvinyl chloride wherein part of the chlorine atoms are substituted by groups of the formula $$-S-CH_2-CH_2-R-(CH_2-CH_2-R)_n-Alk$$

wherein R, which may be identical or different, designates oxygen, sulfur, —NH— or a bond, wherein Alk designates alkyl of up to 14 carbon atoms, and wherein n is an integer of from 1 to 100 or zero.

2. A modified polymer according to claim 1, wherein R is oxygen.

3. A modified polymer according to claim 1, wherein the substituent groups are of the formula $$CH_3-(CH_2)_3-O-(CH_2)_2-O-(CH_2)_2-S-$$

4. A process for the production of modified polyvinyl chlorides defined in claim 1, which comprises reacting an aqueous suspension or emulsion of polyvinyl chloride, in the presence of a small quantity of a solvent adapted to cause swelling of the P.V.C. particles, with a compound of the formula $$Alk-R-(CH_2)_2-(CH_2-CH_2-R)_n-R-CH_2-CH_2-SH$$

wherein Alk, R and n are as defined in claim 1.

5. A process according to claim 4, wherein the solvent is selected from cyclohexanone, THF, methyl-ethyl ketone.

6. A process according to claim 4, wherein the reaction is effected at a temperature between 0° and 100° C.

7. A process according to claim 4, wherein the reactant used for the modification is a polyether thiolate.

8. A process according to claim 4, wherein the reactant used for the modification is selected from 2-(2'-butoxyethoxy)-ethyl thiolate and an alkyl-mercaptan.

* * * * *